USO10745045B2

(12) United States Patent
Sasaki et al.

(10) Patent No.: US 10,745,045 B2
(45) Date of Patent: Aug. 18, 2020

(54) CONTROL DEVICE FOR POWER STEERING DEVICE, AND POWER STEERING DEVICE

(71) Applicant: HITACHI AUTOMOTIVE SYSTEMS, LTD., Hitachinaka-shi, Ibaraki (JP)

(72) Inventors: Mitsuo Sasaki, Hadano (JP); Takumi Hisazumi, Atsugi (JP); Shigehisa Aoyagi, Mito (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 185 days.

(21) Appl. No.: 15/752,679

(22) PCT Filed: Jul. 29, 2016

(86) PCT No.: PCT/JP2016/072288
§ 371 (c)(1),
(2) Date: Feb. 14, 2018

(87) PCT Pub. No.: WO2017/043213
PCT Pub. Date: Mar. 16, 2017

(65) Prior Publication Data
US 2019/0023309 A1 Jan. 24, 2019

(30) Foreign Application Priority Data
Sep. 10, 2015 (JP) ................................ 2015-178051

(51) Int. Cl.
*B62D 5/04* (2006.01)
*H02P 6/16* (2016.01)
*H02P 29/032* (2016.01)

(52) U.S. Cl.
CPC ............. *B62D 5/049* (2013.01); *B62D 5/046* (2013.01); *B62D 5/0463* (2013.01); *H02P 6/16* (2013.01); *H02P 29/032* (2016.02)

(58) Field of Classification Search
CPC ...... B62D 5/049; B62D 5/046; B62D 5/0463; H02P 29/032; H02P 6/16
See application file for complete search history.

(56) References Cited

U.S. PATENT DOCUMENTS 6,615,152 B2 * 9/2003 Fujimoto ............. B62D 5/0487
180/400
7,187,153 B2 * 3/2007 Imagawa ............... B62D 5/046
318/560

(Continued)

FOREIGN PATENT DOCUMENTS

JP 2004-274947 A 9/2004
JP 2005-335591 * 12/2005
(Continued)

*Primary Examiner* — Tony H Winner
*Assistant Examiner* — Michael R Stabley
(74) *Attorney, Agent, or Firm* — Foley & Lardner LLP

(57) ABSTRACT

A power steering device includes a steering mechanism, an electric motor for applying a steering assist force to the steering mechanism, and a first motor rotational position sensor for sensing as an actual axis phase a rotational position of a rotor of the electric motor. A control device is configured to: receive input of a signal of first actual axis phase outputted from the first motor rotational position sensor; receive input of a signal of value of electric current flowing through the electric motor; estimate as a control phase a phase of an induced voltage occurring in the electric motor, based on the signal of value of electric current; and determine whether or not the first motor rotational position sensor is abnormal, based on a difference between the first actual axis phase and the control phase.

17 Claims, 13 Drawing Sheets

(56) References Cited

U.S. PATENT DOCUMENTS

| | | | |
|---|---|---|---|
| 7,294,988 B2 | 11/2007 | Ajima et al. | |
| 7,397,210 B2 * | 7/2008 | Arai | H02P 21/06 |
| | | | 318/434 |
| 8,339,080 B2 * | 12/2012 | Suzuki | B62D 5/0481 |
| | | | 318/400.11 |
| 8,593,093 B2 * | 11/2013 | Hisano | H02P 29/032 |
| | | | 318/400.01 |

FOREIGN PATENT DOCUMENTS

| | | |
|---|---|---|
| JP | 2005-335591 A | 12/2005 |
| JP | 2006-166677 A | 6/2006 |

\* cited by examiner

US 10,745,045 B2

CONTROL DEVICE FOR POWER STEERING DEVICE, AND POWER STEERING DEVICE

TECHNICAL FIELD

The present invention relates to a power steering device and a power steering device control device for application to a vehicle.

BACKGROUND ART

A patent document 1 discloses a known conventional power steering device control device as follows.

The power steering device control device is employed in a power steering device, which the power steering device includes: a steering mechanism configured to transmit rotation of a steering wheel to steered wheels; an electric motor configured to apply a steering assist force to the steering mechanism; and a motor rotational position sensor configured to sense as an actual axis phase a rotational position of a rotor of the electric motor. The power steering device control device is configured to: sense a phase difference between the actual axis phase and a control phase, wherein the control phase is estimated based on a resistance, an inductance, a sensed electric current value, and a voltage command value of winding of the electric motor, and a steering speed; and compensate for the phase difference, and thereby enhance the efficiency of drive of the electric motor.

PRIOR ART DOCUMENT(S)

Patent Document(s)

Patent Document 1: JP 2006-166677 A

SUMMARY OF THE INVENTION

The conventional power steering device control device described above is confronted by a problem that when an abnormality such as a failure occurs in the motor rotational position sensor, the power steering device control device may be unable to calculate the phase difference normally, because the actual axis phase is sensed by the motor rotational position sensor.

The present invention has been made with attention to the technical problem described above, and is targeted for providing a power steering device and a power steering device control device capable of sensing abnormality of a motor rotational position sensor.

According to the present invention, among other things, a power steering device control device for a power steering device, the power steering device including: a steering mechanism configured to transmit rotation of a steering wheel to a steered wheel; an electric motor configured to apply a steering assist force to the steering mechanism; a transmission mechanism disposed between the steering mechanism and the electric motor, and configured to transmit a torque of the electric motor to the steering mechanism; and a motor rotational position sensor configured to sense as an actual axis phase a rotational position of a rotor of the electric motor; the power steering device control device comprises: a control phase estimation part configured to estimate as a control phase a phase of an induced voltage occurring in the electric motor, based on a signal of value of electric current flowing through the electric motor; and a sensor abnormality determination part configured to determine whether or not the motor rotational position sensor is abnormal, based on a difference between the actual axis phase and the control phase.

Effects of the Invention

The present invention makes it possible to sense abnormality of the motor rotational position sensor.

MODE(S) FOR CARRYING OUT THE INVENTION

The following describes a power steering device and a power steering device control device according to embodiments of the present invention in detail with reference to the drawings.

First Embodiment

Figure 1:
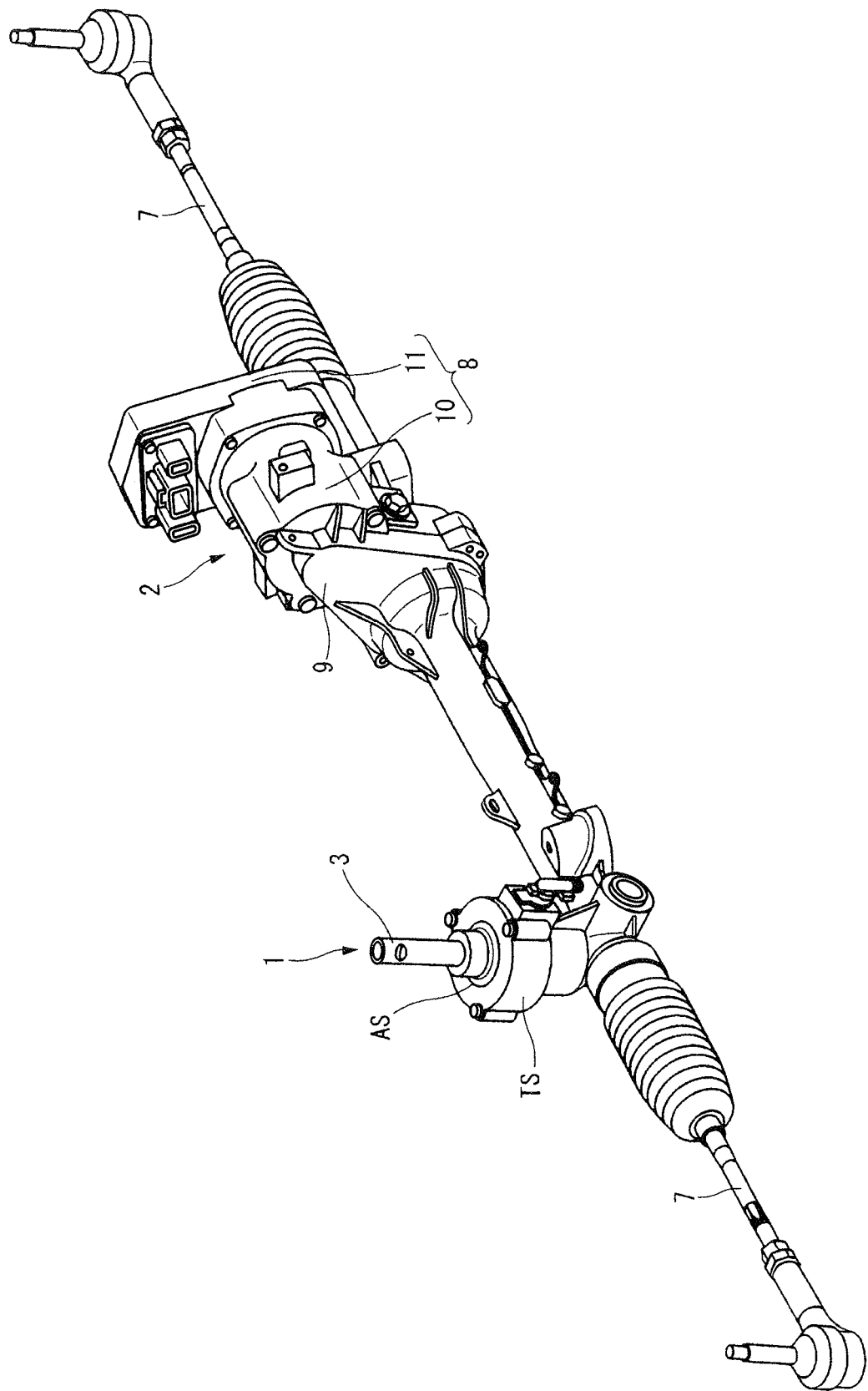
FIG. 1 is a perspective view showing a power steering device according to a first embodiment of the present invention.
Figure 2:
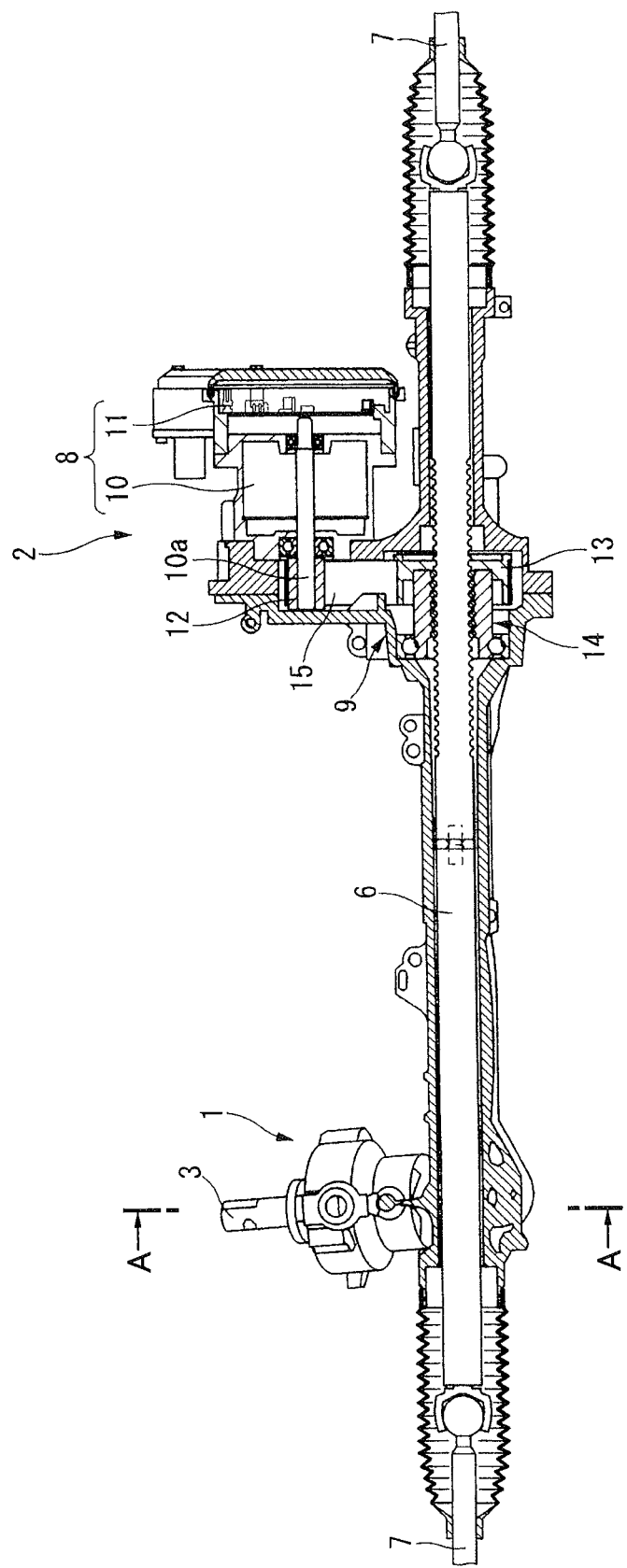
FIG. 2 is a longitudinal sectional view of the power steering device.
Figure 3:
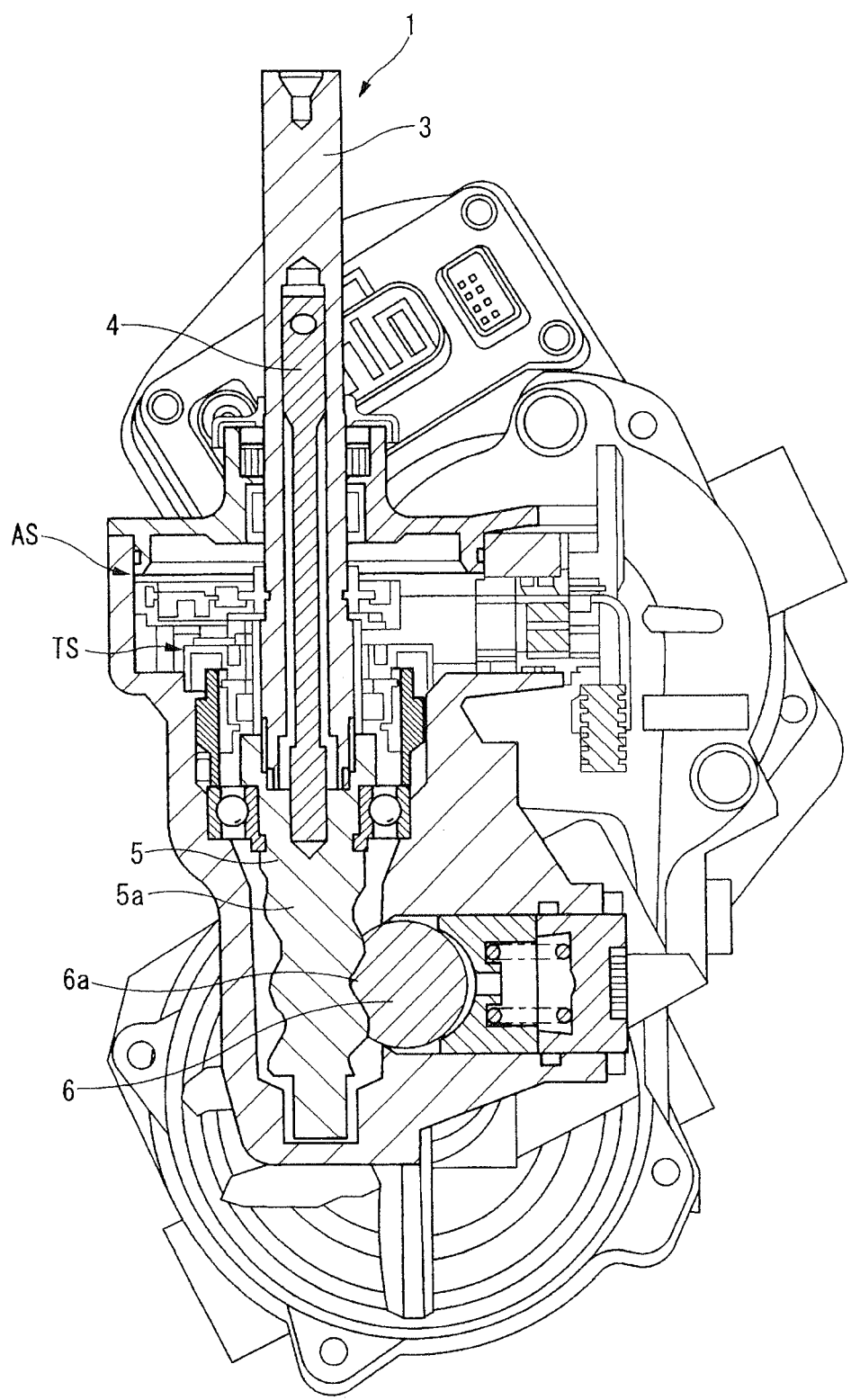
FIG. 3 is a sectional view taken along a line A-A in FIG. 2.

As shown in FIGS. 1 to 3, the power steering device includes a steering mechanism 1 and a steering assist mechanism 2, wherein steering mechanism 1 is configured to transmit rotation of a steering wheel not shown to steered wheels not shown, and wherein steering assist mechanism 2 is configured to assist steering operation of a driver by applying a steering assist force to steering mechanism 1, based on information about steering and others.

Steering mechanism 1 generally includes an input shaft 3, an output shaft 5, and a rack bar 6, wherein input shaft 3 includes a first end side linked to the steering wheel in a manner to rotate integrally with the steering wheel, wherein output shaft 5 includes a first end side coupled to input shaft 3 via a torsion bar 4 in a manner to rotate with respect to input shaft 3, and wherein rack bar 6 includes an outer periphery formed with rack teeth 6a meshed with a pinion gear 5a of an outer periphery of a second end portion of output shaft 5, and is configured to travel in an axial direction of rack bar 6. Rack bar 6 includes end portions linked to the steered wheels via tie rods 7, 7, knuckle arms not shown, etc., respectively, and is configured to change orientation of each steered wheel by pulling the corresponding knuckle arm by axial movement of rack bar 6.

A torque sensor "TS" and a steering angle sensor "AS" are provided in a sensor housing accommodating the input shaft 3 and output shaft 5, wherein torque sensor TS is configured to sense a steering torque in steering mechanism 1 which is caused by driver's steering operation, and wherein steering angle sensor AS is configured to sense a steering angle that is a quantity of rotation of the steering wheel from its neutral position.

Torque sensor TS is configured to calculate the steering torque based on a difference in rotational angle between input shaft 3 and output shaft 5 which is caused by torsion of torsion bar 4. Torque sensor TS is disposed at input shaft 3 so as to rotate along with input shaft 3, wherein input shaft 3 is closer to the steering wheel than torsion bar 4 in a steering force transmission line from the steering wheel to rack bar 6. Torque sensor TS includes main and auxiliary torque sensors TS1, TS2 in pairs (see FIG. 4), and is configured to sense main and auxiliary steering torques by main and auxiliary torque sensors TS1, TS2, and thereafter output signals of these steering torques as main and auxiliary steering torque signals Tr(Main), Tr(Sub) to steering torque signal receiving parts 37a, 37b in a control device 11 described below.

Steering angle sensor AS includes main and auxiliary steering angle sensors AS1, AS2 in pairs (see FIG. 4), and is configured to sense main and auxiliary steering angles by main and auxiliary steering angle sensors AS1, AS2, and thereafter output signals of these steering angles as main and auxiliary steering angle signals θs(Main), θs(Sub) to steering angle signal receiving parts 40a, 40b in control device 11.

As shown in FIG. 2, steering assist mechanism 2 includes: a motor unit 8 configured to output a steering assist force, depending on a result of sensing of torque sensor TS and steering angle sensor AS; and a transmission mechanism 9 configured to transmit the steering assist force (torque) to rack bar 6 while converting the steering assist force into an axial moving force of rack bar 6 with speed reduction.

Motor unit 8 is an integral unit of an electric motor 10 and control device 11, wherein electric motor 10 is configured to rotate an input pulley 12 described below, and thereby apply the steering assist force to rack bar 6 via transmission mechanism 9, and wherein control device 11 is attached to electric motor 10, and is configured to control driving of electric motor 10 depending on parameters such as the steering torque and vehicle speed.

Electric motor 10 is a three-phase brushless DC motor of a so-called permanent magnet field type, wherein a housing accommodating the electric motor 10 is provided with main and auxiliary motor rotational position sensors PS1, PS2 in pairs (see FIG. 4) which are first and second motor rotational position sensors configured to sense an actual axis phase that is a rotational position of a rotor not shown of electric motor 10.

Figure 6:
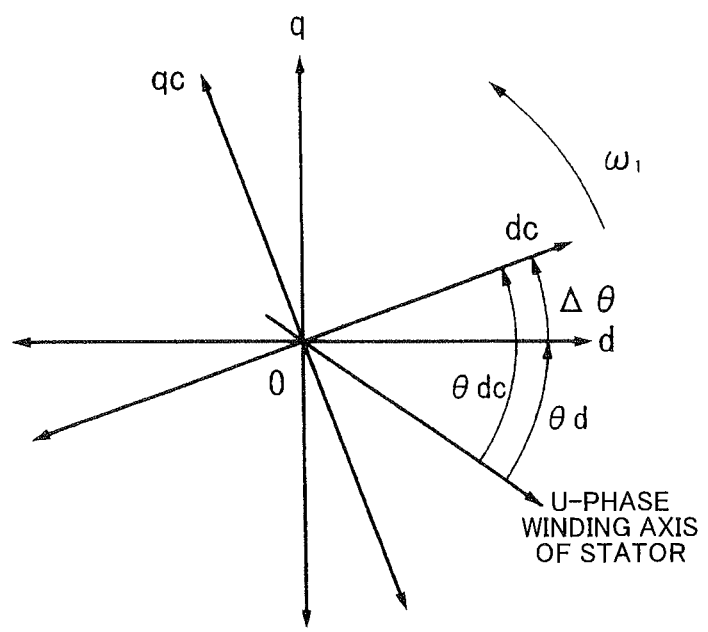
FIG. 6 is a diagram showing a relationship between an actual axis phase and a control phase, and a definition of a phase difference.

The following describes definitions of actual axis and actual axis phase with reference to FIG. 6.

In the present embodiment, a d-q axis coordinate system composed of a d-axis and a q-axis, wherein the d-axis is a pole-to-pole axis of a permanent magnet of the rotor, and the q-axis is perpendicular to the d-axis, is referred to simply as actual axis coordinate system or actual axes, whereas a phase of the d-axis with respect to a U-phase winding axis of a stator not shown of electric motor 10 is referred to as actual axis phase. The polarity of the actual axis phase is defined to be positive when the actual axes are rotating in a counterclockwise direction (normal rotational direction), and be negative when the actual axes are rotating in a clockwise direction (reverse rotational direction).

Each motor rotational position sensor PS1, PS2 is configured to sense the actual axis phase, and output signals of sensed first and second actual axis phases as main and auxiliary actual axis phase signals θd(Main), θd(Sub) in pairs to actual axis phase signal receiving parts 44a, 44b described below in control device 11.

As shown in FIG. 2, transmission mechanism 9 includes: input pulley 12 provided at an outer peripheral side of an output shaft 10a of electric motor 10 in a manner to rotate integrally with output shaft 10a about an axis of output shaft 10a; an output pulley 13 provided at the outer periphery of rack bar 6 in a manner to rotate with respect to rack bar 6, and configured to rotate about an axis of rack bar 6 based on a torque of input pulley 12; a ball screw mechanism 14 disposed between output pulley 13 and rack bar 6, and configured to convert rotation of output pulley 13 into axial movement of rack bar 6 with speed reduction; and a belt 15 wound over the input and output pulleys 12, 13, and configured to transmit rotation of input pulley 12 to output pulley 13, and thereby serve for synchronized rotation of input and output pulleys 12, 13.

Figure 4:
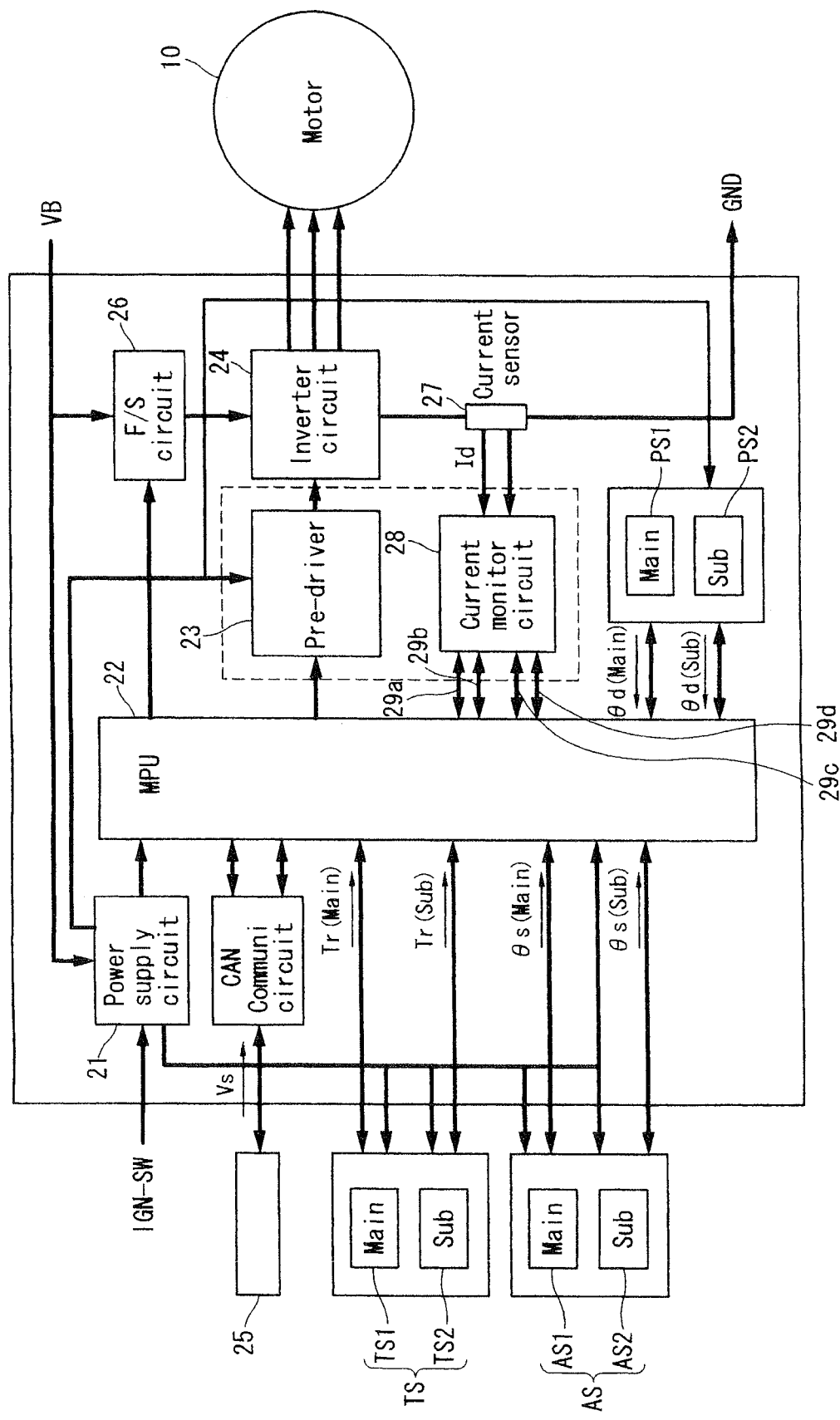
FIG. 4 is a block diagram showing configuration of an electrical system of a control device according to the first embodiment.
Figure 5:
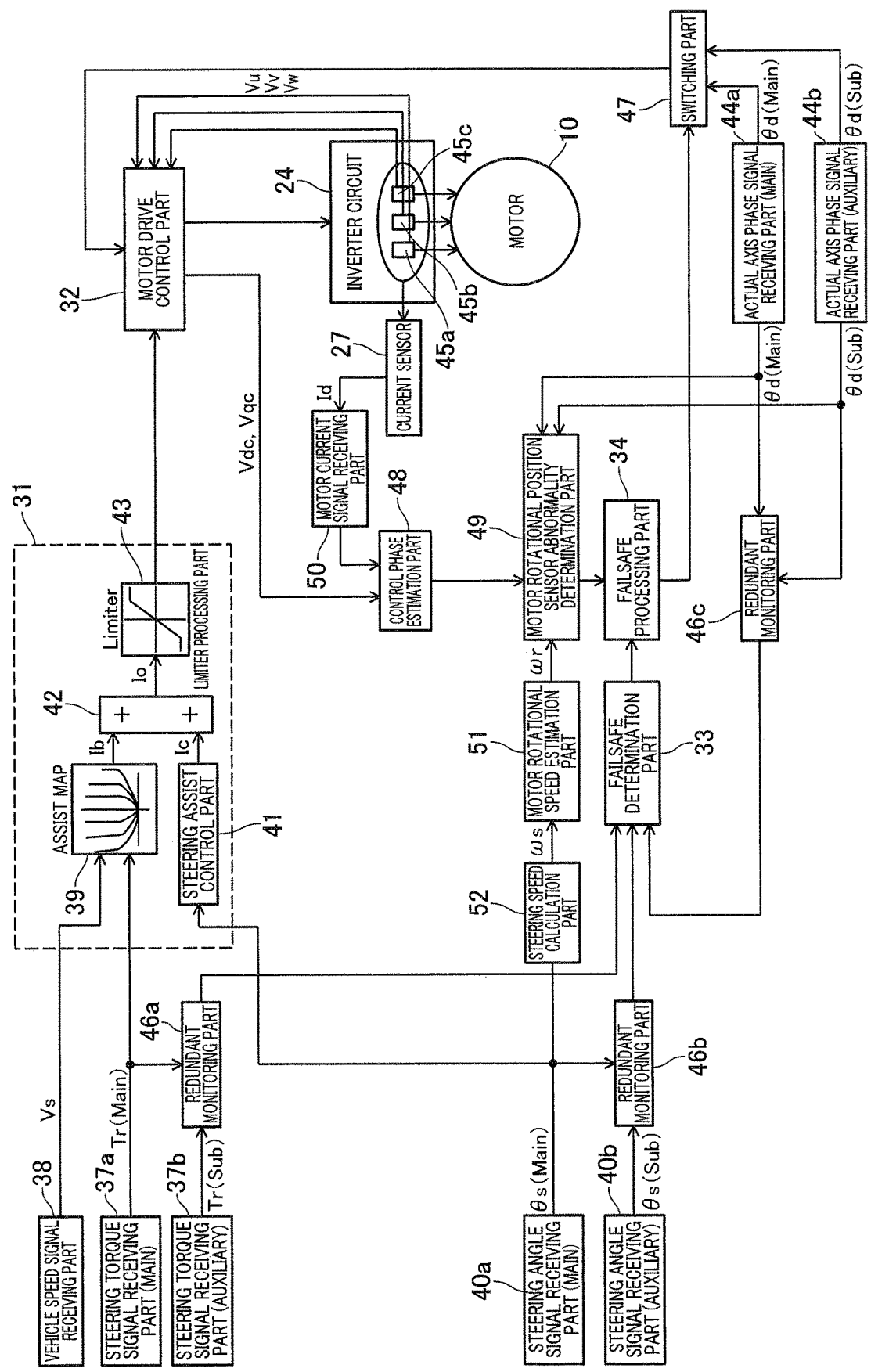
FIG. 5 is a control block diagram showing configuration of a calculating circuit of the control device according to the first embodiment.

The following describes specific configuration of control device 11 according to the present embodiment with reference to FIGS. 4 and 5.

As shown in FIG. 4, control device 11 includes: a power supply circuit 21 serving as a power supply in control device 11; a processing unit (microprocessor unit) 22 configured to be started up by power supply from power supply circuit 21, and perform various calculation operations; a pre-driver 23 configured as an integrated circuit (IC) to receive input of a command signal from processing unit 22; and an inverter circuit 24 configured to be driven and controlled based on a command signal from pre-driver 23.

When power supply circuit 21 receives supply of electric power from a battery "VB" in response to on-operation of an ignition switch "IGN-SW" of the vehicle, power supply circuit 21 supplies the electric power to processing unit 22, torque sensors TS1, TS2, steering angle sensors AS1, AS2, motor rotational position sensors PS1, PS2, and pre-driver 23, while performing appropriate voltage reduction.

Processing unit 22 is connected electrically to a vehicle speed sensor 25, and is configured to receive input of a vehicle speed signal "Vs" from vehicle speed sensor 25, wherein vehicle speed sensor 25 is provided at a differential gear not shown or the like.

Processing unit 22 is also connected electrically to torque sensors TS1, TS2, steering angle sensors AS1, AS2, and motor rotational position sensors PS1, PS2, and is configured to receive input of main and auxiliary steering torque signals Tr(Main), Tr(Sub) from torque sensors TS1, TS2, main and auxiliary steering angle signals θs(Main), θs(Sub) from steering angle sensors AS1, AS2, and main and auxiliary actual axis phase signals θd(Main), θd(Sub) from motor rotational position sensors PS1, PS2.

When receiving a command signal from pre-driver 23, the inverter circuit 24 convers the electric power from battery VB from direct current to three-phase alternating current and supply the same to electric motor 10 in accordance with the command signal. A failsafe circuit 26 is disposed between battery VB and inverter circuit 24, and is configured to shut off the electric power sent from battery VB to inverter circuit 24, based on commanding of processing unit 22, when a failure or the like occurs in the power steering device.

A motor current sensing part 27 is disposed at a downstream side of inverter circuit 24, and is configured to sense an actual motor current "Id" that is an actual current flowing through the electric motor 10. The actual motor current Id sensed by motor current sensing part 27 is inputted to a current monitoring circuit 28 provided in control device 11. Thereafter, actual motor current Id is applied with high-response filter processing by main and auxiliary current sensing circuits 29a, 29b for motor control in pairs, and is fed back to processing unit 22, and is also applied with low-response filter processing by main and auxiliary current sensing circuits 29c, 29d for overcurrent sensing in pairs, and is fed back to processing unit 22.

As shown in FIG. 5, control device 11 includes: a motor command signal calculation part 31 configured to calculate a motor command signal "Io" for control of driving of electric motor 10, based on main steering torque signal Tr(Main); a motor drive control part 32 configured to control driving of electric motor 10 by outputting a command voltage to inverter circuit 24, based on motor command signal Io and others; a failsafe determination part 33 configured to determine whether or not a failsafe operation is required, based on comparison between main and auxiliary sensing signals outputted from each of the various sensors; and a failsafe processing part 34 configured to perform various failsafe operations, based on a result of determination by failsafe determination part 33 and others.

Motor command signal calculation part 31 calculates a basic signal "Ib" by using a prepared assist map 39, based on main steering torque signal Tr(Main) inputted through steering torque signal receiving part 37a from main torque sensor TS1, and a vehicle speed signal Vs inputted through a vehicle speed signal receiving part 38 from vehicle speed sensor 25. Motor command signal calculation part 31 further includes: a steering assist control part 41 configured to calculate a correction signal "Ic" in parallel, based on main steering angle signal θs(Main) inputted through steering angle signal receiving part 40a from main steering angle sensor AS1; and an adder 42 configured to calculate motor command signal Io by adding the correction signal Ic to basic signal Ib.

Furthermore, motor command signal calculation part 31 includes a limiter processing part 43 configured to control an upper limit value of motor command signal Io variably. For example, when electric motor 10 is overheated, the limiter processing part 43 sets the upper limit value of motor command signal Io lower than in a normal state.

Motor drive control part 32 controls driving of electric motor 10, generally based on motor command signal Io inputted from motor command signal calculation part 31 (limiter processing part 43), and main actual axis phase signal θd(Main) inputted through actual axis phase signal receiving part 44a and a switching part 47 described below from main motor rotational position sensor PS1, and three-phase voltage values Vu, Vv, Vw sensed by voltage sensors 45a-45c provided in inverter circuit 24.

In situations such as a situation where a sensor abnormality determination part 49 described below determines that main motor rotational position sensor PS1 is abnormal, electric motor 10 is controlled by using the auxiliary actual axis phase signal θd(Sub) instead of main actual axis phase signal θd(Main), wherein auxiliary actual axis phase signal θd(Sub) is inputted through actual axis phase signal receiving part 44b and switching part 47 described below from auxiliary motor rotational position sensor PS2.

Failsafe determination part 33 is connected to a first redundant monitoring part 46a, a second redundant monitoring part 46b, and a third redundant monitoring part 46c, wherein first redundant monitoring part 46a is configured to monitor the main and auxiliary steering torque signals Tr(Main), Tr(Sub) inputted through steering torque signal receiving parts 37a, 37b, wherein second redundant monitoring part 46b is configured to monitor the main and auxiliary steering angle signals θs(Main), θs(Sub) inputted through steering angle signal receiving parts 40a, 40b, and wherein third redundant monitoring part 46c is configured to monitor the main and auxiliary actual axis phase signals θd(Main), θd(Sub) inputted through actual axis phase signal receiving parts 44a, 44b.

Each redundant monitoring part 46a-46c is configured to calculate a difference between the corresponding inputted main and auxiliary signals, and when the difference becomes greater than or equal to a predetermined value, assume that the corresponding sensor becomes abnormal, and output to failsafe determination part 33 a signal indicating the occurrence of abnormality.

Failsafe processing part 34 performs a failsafe operation as occasion arises, depending on an abnormality occurrence signal inputted from failsafe determination part 33 or a result of determination of sensor abnormality determination part 49 described below, wherein the failsafe operation includes an operation to warn a driver by turning on a warning light not shown provided on an instrument panel of the vehicle, and an operation to activate the switching part 47 to shift between actual axis phase signals θd(Main), θd(Sub) for input to motor drive control part 32, and an operation to shut off the steering assist control system.

Control device 11 further includes: a control phase estimation part 48 configured to estimate as a control phase a phase of induced voltage (control axis) occurring in electric motor 10; and sensor abnormality determination part 49 configured to determine whether or not main and auxiliary motor rotational position sensors PS1, PS2 are abnormal, based on a difference between the actual axis phase and the control phase estimated by control phase estimation part 48.

The following describes definitions of the control axis and the control phase with reference to FIG. 6.

In the present embodiment, a dc-qc axis coordinate system composed of a dc-axis and a qc-axis, wherein the dc-axis is a pole-to-pole axis of a magnet of an imaginary rotor for the control, and the qc-axis is perpendicular to the dc-axis, is referred to simply as control axis coordinate system or control axes, whereas a phase of the dc-axis with respect to the U-phase winding axis of the stator not shown of electric motor 10 is referred to as control phase. The polarity of the control phase is defined to be positive when the control axes are rotating in a counterclockwise direction (normal rotational direction), and be negative when the control axes are rotating in a clockwise direction (reverse rotational direction).

Control phase estimation part 48 is configured to: estimate the control phase, based on: voltages Vdc, Vqc that are dc-axis and qc-axis components of the command voltage calculated in motor drive control part 32; electric currents Idc, Iqc that are dc-axis and qc-axis components of actual motor current Id inputted through motor current signal receiving part 50; a rotational speed ω1 of the control phase calculated based on a frequency of voltage applied to electric motor 10; a resistance "r" of winding of electric motor 10; and an inductance "Lq" of electric motor 10; and output a signal of the estimated control phase as a control phase signal θdc to sensor abnormality determination part 49.

Sensor abnormality determination part 49 is configured to: determine whether or not main motor rotational position sensor PS1 is abnormal, when motor drive control part 32 is controlling the electric motor 10 based on main actual axis phase signal θd(Main); and determine whether or not auxiliary motor rotational position sensor PS2 is abnormal, when motor drive control part 32 is controlling the electric motor 10 based on auxiliary actual axis phase signal θd(Sub).

Specifically, sensor abnormality determination part 49 has a function of calculating main and auxiliary phase differences Δθ(Main), Δθ(Sub) each of which is a difference between control phase signal θdc inputted from control phase estimation part 48 and a corresponding one of main and auxiliary actual axis phase signals θd(Main), θd(Sub) sensed by motor rotational position sensor PS1, PS2. More specifically, main and auxiliary phase differences Δθ(Main), Δθ(Sub) are calculated by using the following equation (1).

$$\Delta\theta = \tan^{-1}\left[\frac{Vdc - r \cdot Idc + \omega 1 Lq \cdot Iqc}{Vqc - r \cdot Iqc - \omega 1 Lq \cdot Idc}\right] \quad (1)$$

Equation (1) is well known as an equation used for a case where electric motor 10 is precisely controlled in sensorless state, which is derived as disclosed specifically in patent document 1 (JP 2006-166677 A).

More specifically, equation (1) is for calculation of main and auxiliary phase differences Δθ(Main), Δθ(Sub) in a situation where electric motor 10 is rotating in the normal rotational direction. In a situation where electric motor 10 is rotating in the reverse rotational direction, main and auxiliary phase differences Δθ(Main), Δθ(Sub) are calculated by using the following equation (2), yielding the same values as calculated by using the equation (1).

$$\Delta\theta = \tan^{-1}\left[\frac{(-1) \cdot (Vdc - r \cdot Idc + \omega 1 Lq \cdot Iqc)}{(-1) \cdot (Vqc - r \cdot Iqc - \omega 1 Lq \cdot Idc)}\right] \quad (2)$$

Furthermore, main and auxiliary phase differences Δθ(Main), Δθ(Sub) can be calculated by using the following equation (3).

$$\Delta\theta = \tan^{-1}\left[\frac{Idc - r \cdot Vdc + \omega 1 Lq \cdot Vqc}{Iqc - r \cdot Vqc - \omega 1 Lq \cdot Vdc}\right] \quad (3)$$

The thus-calculated main and auxiliary phase differences Δθ(Main), Δθ(Sub) are basically in a predetermined angular range even with some errors in calculation and some errors in attachment, when motor rotational position sensors PS1, PS2 are attached to electric motor 10 correctly, and are operating normally.

When the calculated phase difference Δθ(Main), Δθ(Sub) is out of the predetermined angular range, the sensor abnormality determination part 49 determines that the corresponding motor rotational position sensor PS1, PS2 becomes abnormal, and outputs a result of determination to failsafe processing part 34. Failsafe processing part 34 performs various failsafe operations depending on situations, which are described in detail below in a section for abnormality determination control flow for motor rotational position sensors PS1, PS2.

As generally known, when rotational speed ωr of electric motor 10 (henceforth referred to simply as motor rotational speed ωr) is low, namely, when rotational speed ω1 of the control axis is low, a large error of calculation occurs in the phase differences Δθ(Main), Δθ(Sub) calculated by the equations (1)-(3).

In consideration of that, the sensor abnormality determination part 49 is configured to stop determining whether or not each motor rotational position sensor PS1, PS2 is abnormal, in response to a condition where motor rotational speed ωr is estimated and inputted by a motor rotational speed estimation part 51, and is lower than or equal to a predetermined value.

Motor rotational speed estimation part 51 is configured to: estimate motor rotational speed ωr, based on steering speed signal ωs, depending on a quantity of torsion of torsion bar 4, where steering speed signal ωs is obtained by time-differentiation of the main steering angle signal θs(Main) inputted from steering speed calculation part 52; and output the estimated motor rotational speed ωr to sensor abnormality determination part 49.

Figure 7:
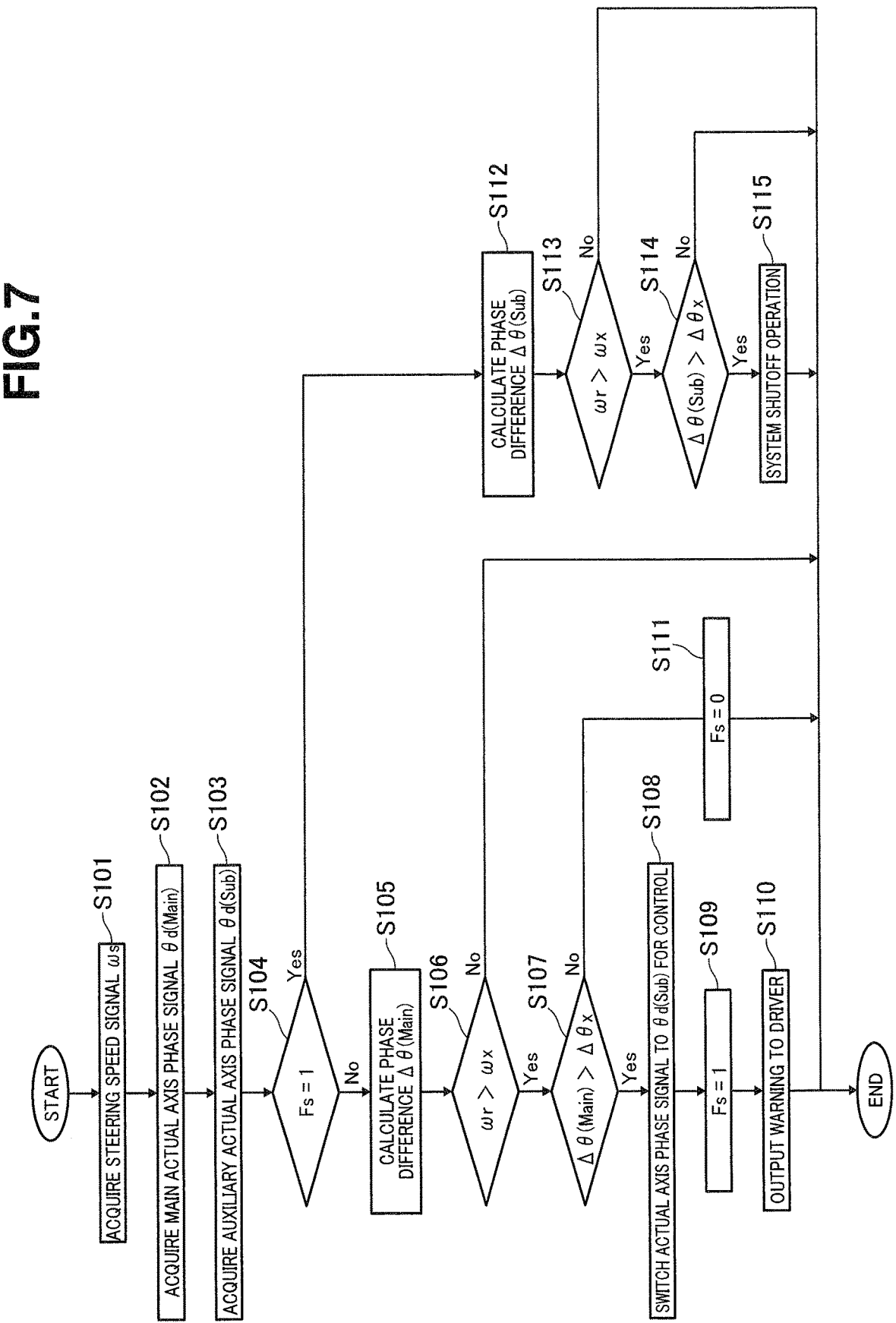
FIG. 7 is a flow chart showing an abnormality determination processing control for a motor rotational position sensor according to the first embodiment.

The following describes specifically an abnormality determination processing control for motor rotational position sensors PS1, PS2, which is performed by control device 11 according to the present embodiment, with reference to a flow chart shown in FIG. 7.

Control device 11 first acquires steering speed signal ωs from steering speed calculation part 52 (Step S101), and further acquires main actual axis phase signal θd(Main) sensed by main motor rotational position sensor PS1 (Step S102). Subsequently, control device 11 acquires auxiliary actual axis phase signal θd(Sub) sensed by auxiliary motor rotational position sensor PS2 (Step S103), and thereafter determines whether or not an auxiliary sensor diagnosis flag Fs described below is set (Step S104).

In case of NO at Step S104, control device 11 determines that abnormality determination for main motor rotational position sensor PS1 is to be performed, and calculates phase difference Δθ(Main) between main actual axis phase signal θd(Main) and the control phase by using the equation (1) or the like (Step S105), and further determines whether or not motor rotational speed ωr estimated from steering speed signal ωs is greater than a predetermined value ωx (Step S106). In case of NO at Step S106, control device 11 terminates the present program without diagnosis, for prevention of incorrect diagnosis. On the other hand, in case of YES at Step S106, control device 11 determines that the diagnosis is to be continued, and proceeds to Step S107.

At Step S107, control device 11 determines whether or not the phase difference Δθ(Main) calculated at Step S105 is greater than or equal to a predetermined value Δθx. In case of NO at Step S107, control device 11 determines that main motor rotational position sensor PS1 is not abnormal, and rests the auxiliary sensor diagnosis flag Fs (Step S111), and thereafter terminates the present program.

On the other hand, in case of YES at Step S107, control device 11 determines that main motor rotational position sensor PS1 becomes abnormal, and shifts the actual axis phase signal used for control of electric motor 10 from main actual axis phase signal θd(Main) to auxiliary actual axis phase signal θd(Sub) (Step S108), and sets the auxiliary sensor diagnosis flag Fs that is a flag related to abnormality determination for auxiliary motor rotational position sensor PS2 (Step S109), and outputs a warning to a driver, namely, warns the driver by turning on the warning light on the instrument panel of the vehicle (Step S110), and thereafter terminates the present program.

In case of YES at Step S104 (auxiliary sensor diagnosis flag Fs is set), control device 11 determines that abnormality determination for auxiliary motor rotational position sensor PS2 is to be performed, and calculates the phase difference Δθ(Sub) between auxiliary actual axis phase signal θd(Sub) and the control phase by using the equation (1) or the like (Step S112), and further determines whether or not motor rotational speed ωr is greater than predetermined value ωx (Step S113). In case of NO at Step S113, control device 11 terminates the present program without diagnosis, for prevention of incorrect diagnosis. On the other hand, in case of YES at Step S113, control device 11 determines that the diagnosis is to be continued, and proceeds to Step S114.

At Step S114, control device 11 determines whether or not the phase difference Δθ(Sub) calculated at Step S112 is greater than predetermined value Δθx. In case of NO at Step S114, control device 11 determines that auxiliary motor rotational position sensor PS2 is not abnormal, and terminates the present program.

On the other hand, in case of YES at Step S114, control device 11 determines that both of main and auxiliary motor rotational position sensors PS1, PS2 become abnormal, and causes the failsafe processing part 34 to shut off the steering assist control system performed by electric motor 10 (Step S115), and thereafter terminates the present program.

Effects of Action of First Embodiment

The power steering device configured as described above is capable of determining abnormality of each motor rotational position sensor PS1, PS2 by sensor abnormality determination part 49. This serves to enhance safety of the power steering device when drive control of electric motor 10 is based on each motor rotational position sensor PS1, PS2.

Moreover, in the present embodiment, when sensor abnormality determination part 49 determines abnormality of each motor rotational position sensor PS1, PS2, the phase difference Δθ(Main), Δθ(Sub) is calculated by the equation as employed for sensorless control, so that it is possible to perform precise abnormality determination.

In particular, equations (1)-(3) used in the present embodiment depend on motor parameters such as resistance r and inductance Lq of electric motor 10, so that it is possible to further enhance the precision of abnormality determination.

The configuration disclosed in patent document 1 where the electric motor is driven by sensorless control, is already provided with sensors and others for sensing parameters required to calculate phase difference Δθ. Accordingly, for application of the present invention to that configuration, it is sufficient to modify the configuration of control system in processing unit 22 without provision of additional sensors.

In the present embodiment, even when main motor rotational position sensor PS1 becomes abnormal, the drive control of electric motor 10 by motor drive control part 32 can be continued based on auxiliary actual axis phase signal θd(Sub) sensed by auxiliary motor rotational position sensor PS2, so that it is possible to continue to reduce the driver's steering load.

Furthermore, in the present embodiment, when drive control of electric motor 10 is performed by motor drive control part 32 based on auxiliary actual axis phase signal θd(Sub), sensor abnormality determination part 49 determines whether or not auxiliary motor rotational position sensor PS2 is abnormal. This serves to ensure the continuity of the abnormal determination control, and thereby further enhance safety of the power steering device.

In the present embodiment, sensor abnormality determination part 49 is prevented from determining whether or not each motor rotational position sensor PS1, PS2 is abnormal, when motor rotational speed ωr estimated from steering speed signal ωs is less than or equal to predetermined value ωx, namely, when a significant error may occur in calculation of phase differences Δθ(Main), Δθ(Sub). This serves to prevent incorrect determination caused by the error in calculation.

Moreover, in the present embodiment, estimation of motor rotational speed ωr is not based on actual axis phase signals θd(Main), θd(Sub) outputted by motor rotational position sensors PS1, PS2 whose abnormalities are to be determined, but is based on another signal. This serves to correctly determine whether or not to perform the abnormality determination.

In particular, in the present embodiment, steering angle signal θs is employed as another signal, where steering angle signal θs is a steering angle of the steering wheel whose motion is linked with motion of electric motor 10 through gears and others. This makes it easy to estimate motor rotational speed ωr. The feature that the estimation depends on the quantity of torsion of torsion bar 4 serves to precisely estimate motor rotational speed ωr, even when a deviation occurs between steering angle signal θs and the rotational position of the rotor of electric motor 10 with torsion of torsion bar 4.

Second Embodiment

Figure 8:
FIG. 8 is a flow chart showing an abnormality determination processing control for a motor rotational position sensor according to a second embodiment.

FIG. 8 is a flow chart showing an abnormality determination control for motor rotational position sensors PS1, PS2 according to a second embodiment, which is configured based on the first embodiment such that when abnormality of main motor rotational position sensor PS1 is affirmed and the sensor employed for motor control is shifted to auxiliary motor rotational position sensor PS2, motor drive control part 32 limits the output of electric motor 10, for example, by means for reducing the voltage command value outputted to inverter circuit 24.

Specifically, in the abnormality determination flow for motor rotational position sensors PS1, PS2 according to the present embodiment, in case of NO at Step S114, namely, when it is determined that phase difference Δθ(Sub) between auxiliary actual axis phase signal θd(Sub) and the control phase is less than predetermined value Δθx, control device 11 causes motor drive control part 32 to limit the output of electric motor 10 (Step S116), and thereafter terminates the present program.

In the present embodiment, when main motor rotational position sensor PS1 becomes abnormal and only auxiliary motor rotational position sensor PS2 remains normal, constant limitation of the output of electric motor 10 serves to suppress the steering load from rapidly increasing when the steering assist force is shut off based on determination that auxiliary motor rotational position sensor PS2 is abnormal, and thereby enhance safety of the power steering device.

Third Embodiment

Figure 9:
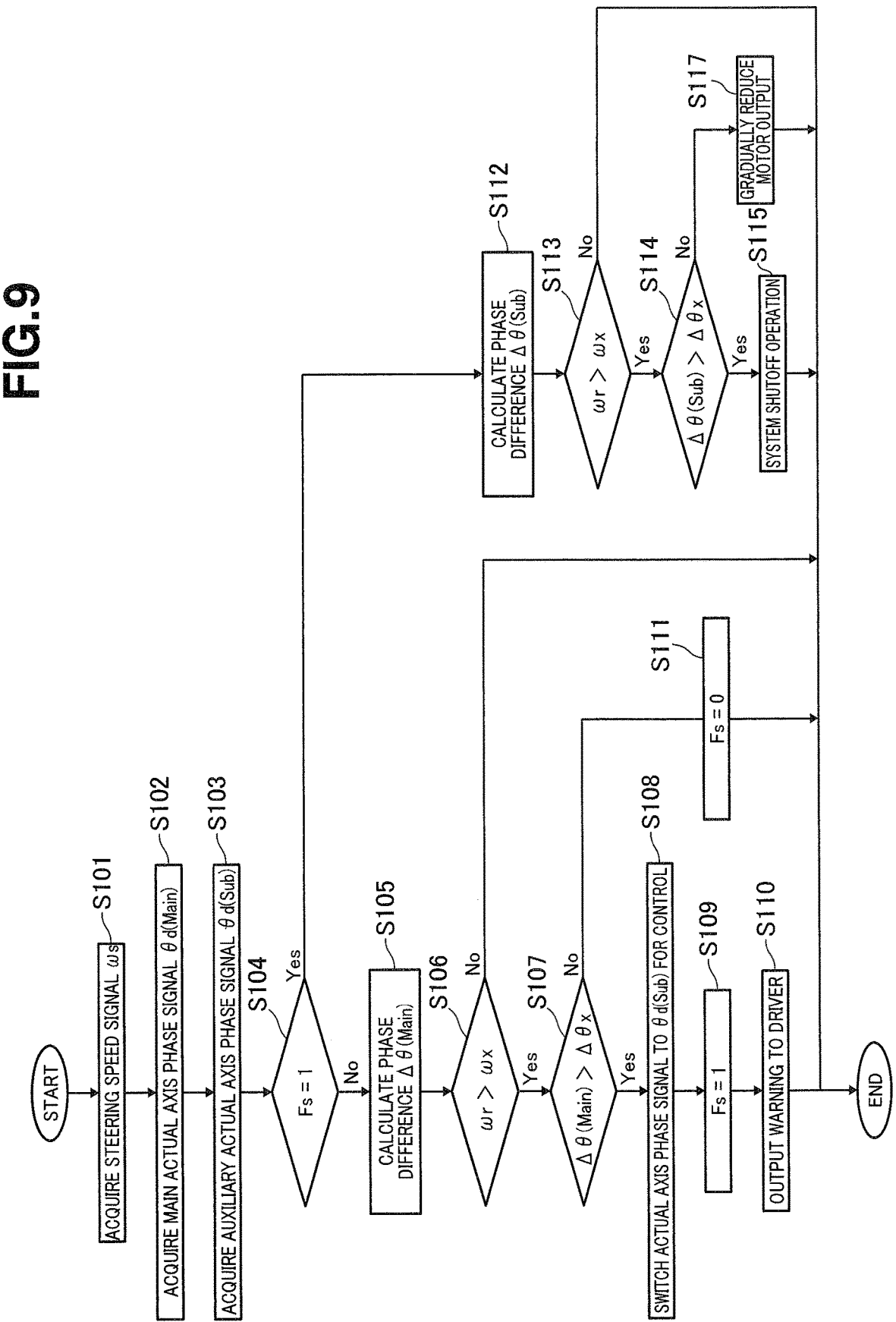
FIG. 9 is a flow chart showing an abnormality determination processing control for a motor rotational position sensor according to a third embodiment.

FIG. 9 is a flow chart showing an abnormality determination control for motor rotational position sensors PS1, PS2 according to a third embodiment, which is configured by replacement of the motor output limiting operation in the abnormality determination control according to the second embodiment (Step S116 in FIG. 8) with a motor output gradually reducing operation (Step S117) for causing the motor drive control part 32 to gradually reduce the motor output with time.

According to the present embodiment, it is possible to reduce the motor output gradually, and thereby significantly suppress a driver from feeling uncomfortable about steering with limitation of the steering assist force, and thereby further enhance the safety of the power steering device.

Fourth Embodiment

Figure 10:
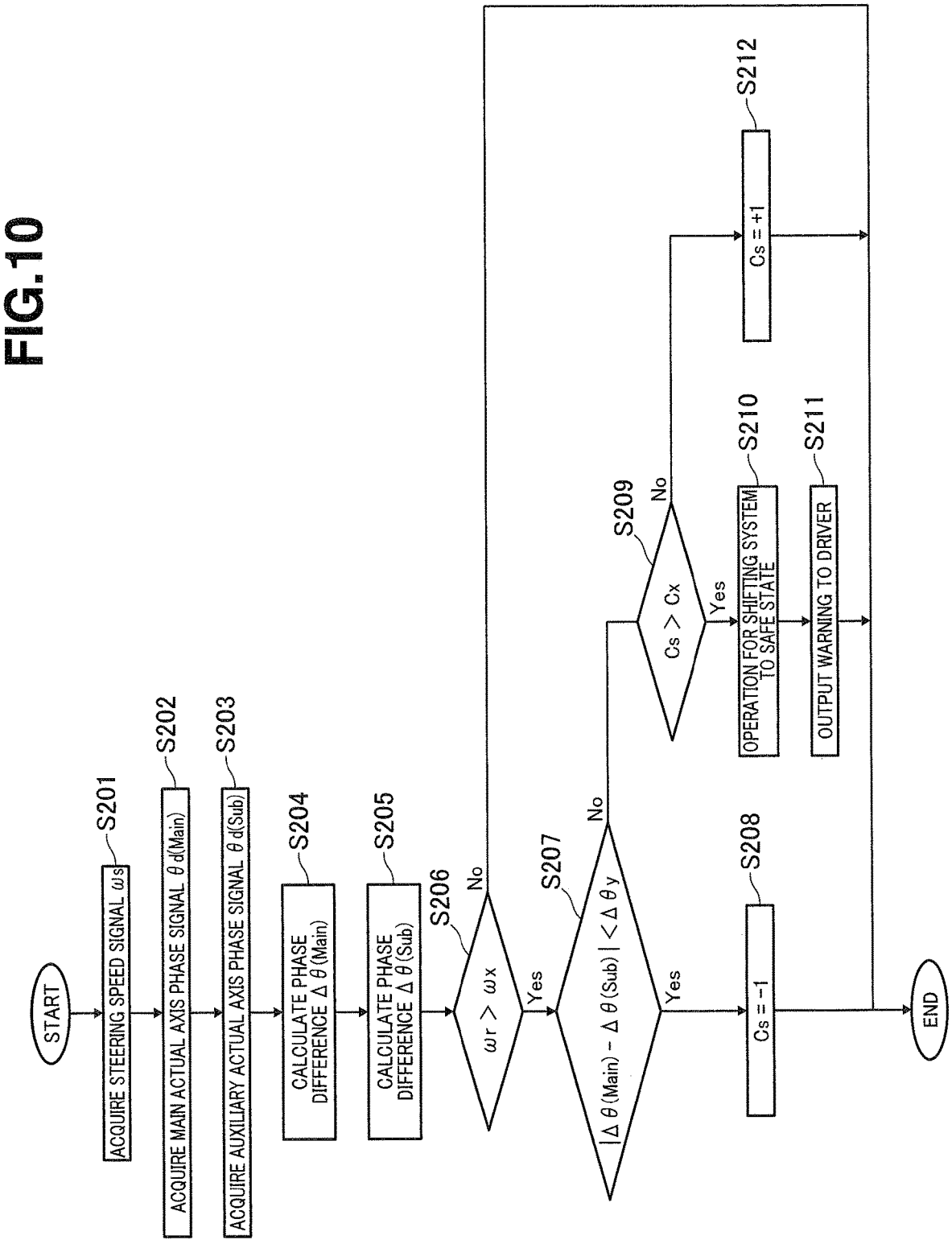
FIG. 10 is a flow chart showing an abnormality determination processing control for a motor rotational position sensor according to a fourth embodiment.

FIG. 10 is a flow chart showing an abnormality determination control for motor rotational position sensors PS1, PS2 according to a fourth embodiment, where the abnormality determination for each motor rotational position sensor PS1, PS2 by sensor abnormality determination part 49 is based on comparison between phase difference $\Delta\theta$(Main) and phase difference $\Delta\theta$(Sub).

Specifically, in the abnormality determination control flow according to the present embodiment, at Steps S201-S203, control device 11 first performs operations similar to Step S101-S103 in the flow chart according to the first embodiment.

Subsequently, control device 11 calculates phase difference $\Delta\theta$(Main) between main actual axis phase signal $\theta$d(Main) and control phase signal $\theta$dc, and phase difference $\Delta\theta$(Sub) between auxiliary actual axis phase signal $\theta$d(Sub) and control phase signal $\theta$dc (Steps S204, S205), and thereafter determines whether or not motor rotational speed $\omega$r estimated from steering speed signal $\omega$s is greater than predetermined value $\omega$x (Step S206). In case of NO at Step S206, control device 11 terminates the present program without diagnosis, for prevention of incorrect diagnosis. On the other hand, in case of YES at Step S206, control device 11 determines that the diagnosis is to be continued, and proceeds to Step S207.

At Step S207, control device 11 determines whether or not a difference between main phase difference $\Delta\theta$(Main) and auxiliary phase difference $\Delta\theta$(Sub), which are calculated at Steps S204, S205, is less than a predetermined value $\Delta\theta$y. In case of YES at Step S207, control device 11 determines that each motor rotational position sensor PS1, PS2 is not abnormal, and decrements a motor rotational position sensor abnormality counter "Cs"(Step S208), and thereafter terminates the present program.

On the other hand, in case of NO at Step S207, control device 11 determines that at least one of motor rotational position sensors PS1, PS2 becomes abnormal, and proceeds to Step S209. At Step S209, control device 11 determines whether or no motor rotational position sensor abnormality counter Cs is greater than a predetermined value "Cx". In case of NO at Step S209, control device 11 determines that the abnormality determination is to be continued, and increments motor rotational position sensor abnormality counter Cs (Step S212), and thereafter terminates the present program.

On the other hand, in case of YES at Step S209, control device 11 confirms that at least one of motor rotational position sensors PS1, PS2 is abnormal, and causes failsafe processing part 34 to perform an operation for shifting the steering assist control system into a safe state by shutoff operation or the like (Step S210), and further outputs a warning to a driver, namely, warns the driver by turning on the warning light on the instrument panel of the vehicle (Step S211), and thereafter terminates the present program.

Also in the present embodiment, the power steering device configured as described above is capable of precisely determining abnormality of each motor rotational position sensor PS1, PS2 by sensor abnormality determination part 49. This serves to enhance safety of the power steering device when drive control of electric motor 10 is based on each motor rotational position sensor PS1, PS2.

Fifth Embodiment

Figure 11:
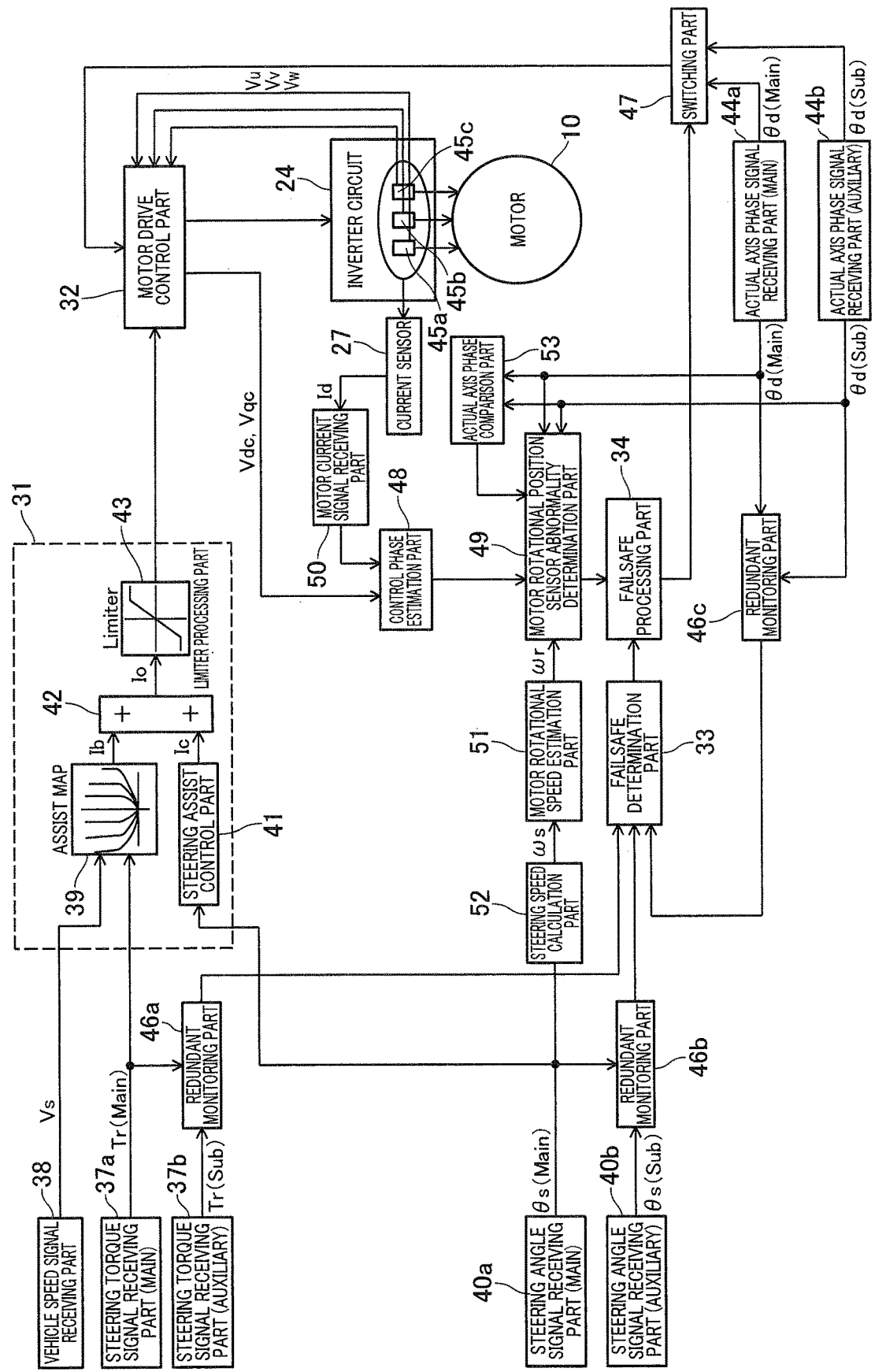
FIG. 11 is a control block diagram showing configuration of a calculating circuit of a control device according to a fifth embodiment.
Figure 12:
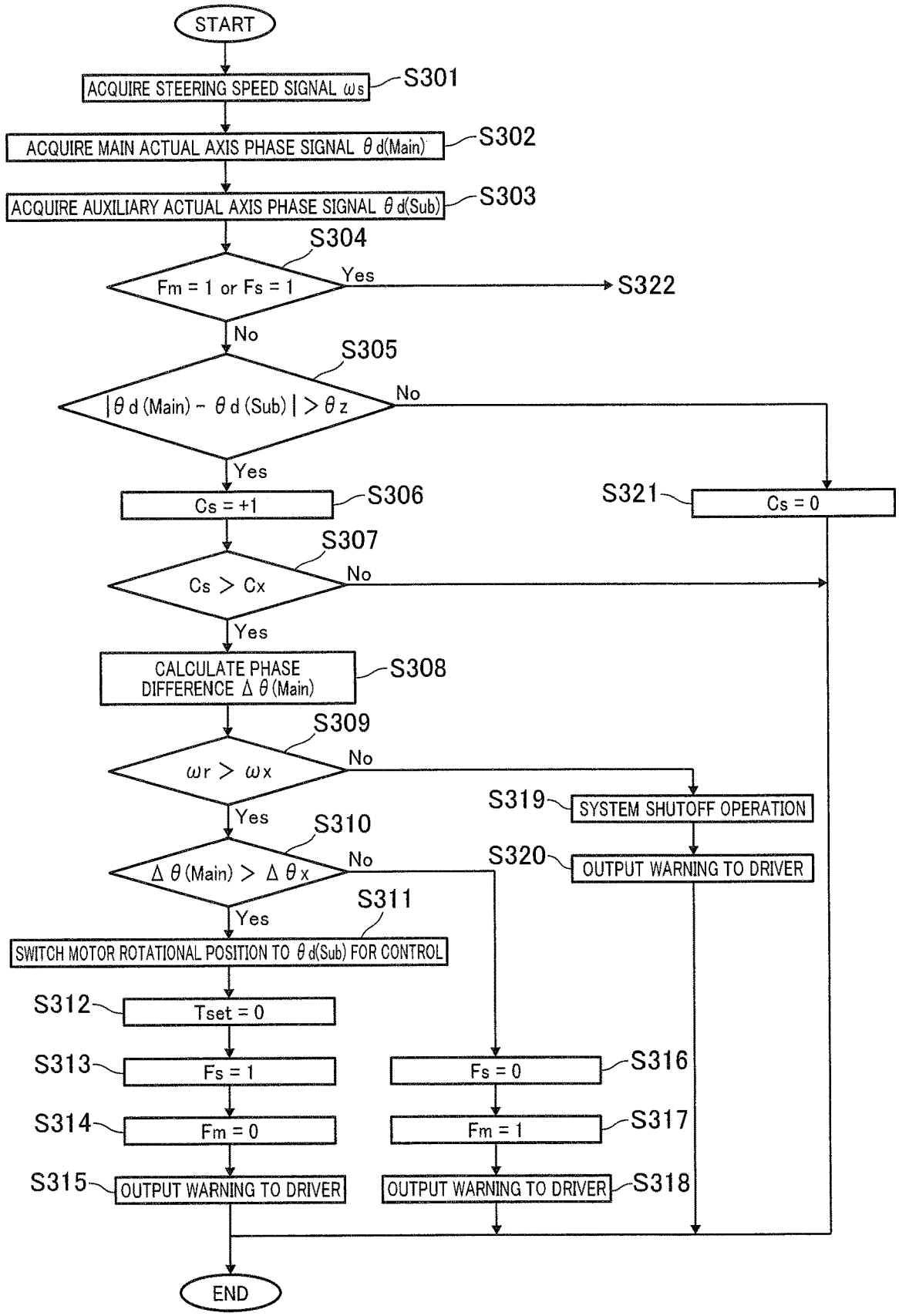
FIG. 12 is a flow chart showing an abnormality determination processing control for a motor rotational position sensor according to the fifth embodiment.
Figure 13:
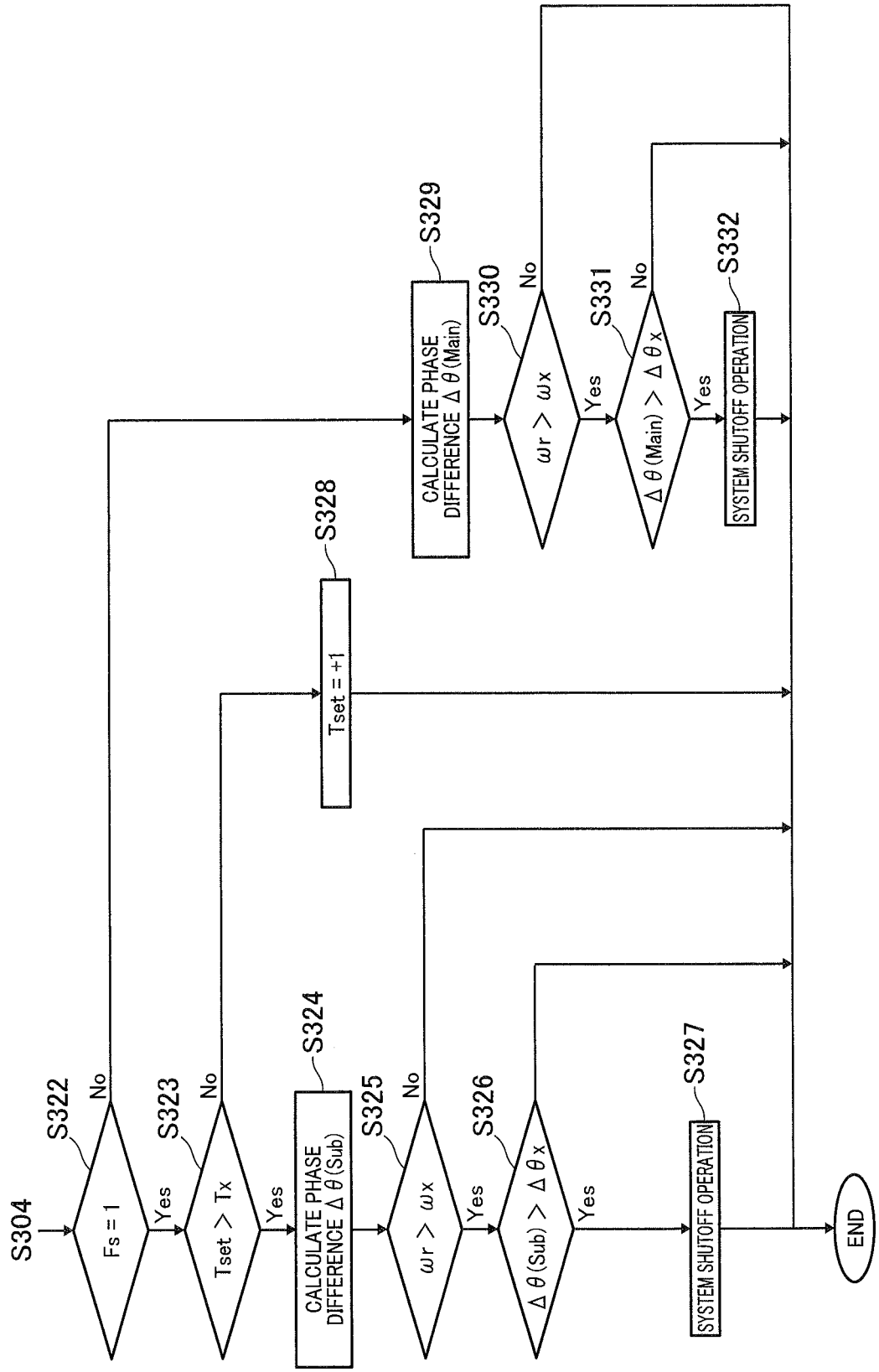
FIG. 13 is a flow chart showing a control process performed when one of two motor rotational position sensors becomes abnormal in the flow chart of FIG. 12.

FIGS. 11 to 13 show a power steering device according to a fifth embodiment of the present invention, which is configured based on the first embodiment such that sensor abnormality determination part 49 determines whether or not each motor rotational position sensor PS1, PS2 is abnormal, depending on a difference between main actual axis phase signal $\theta$d(Main) and auxiliary actual axis phase signal $\theta$d(Sub).

As shown in FIG. 11, control device 11 according to the fifth embodiment includes an actual axis phase comparison part 53 in addition to the configuration of the first embodiment, for comparing main actual axis phase signal $\theta$d(Main) with auxiliary actual axis phase signal $\theta$d(Sub).

Actual axis phase comparison part 53 is configured to calculate the absolute value of the difference between main actual axis phase signal $\theta$d(Main) and auxiliary actual axis phase signal $\theta$d(Sub) inputted from actual axis phase signal receiving parts 44a, 44b, and output a result of the calculation (result of comparison) to sensor abnormality determination part 49.

Sensor abnormality determination part 49 according to the present embodiment is configured to determine whether or not main and auxiliary motor rotational position sensors PS1, PS2 are abnormal, based on the difference between control phase signal $\theta$dc and main actual axis phase signal $\theta$d(Main) or auxiliary actual axis phase signal $\theta$d(Sub), and the result of comparison outputted from actual axis phase comparison part 53.

Specifically, sensor abnormality determination part 49 determines that the corresponding motor rotational position sensor PS1 (PS2) is abnormal, in response to a condition that the absolute value of the difference between main actual axis phase signal $\theta$d(Main) and auxiliary actual axis phase signal $\theta$d(Sub) outputted from actual axis phase comparison part 53 is greater than a predetermined value $\theta$z, and phase difference $\Delta\theta$(Main), $\Delta\theta$(Sub) is greater than predetermined value $\Delta\theta$x.

Sensor abnormality determination part 49 is further configured to: be prevented from determining abnormality of auxiliary motor rotational position sensor PS2 in a situation where the system shifts from a state where motor drive control part 32 controls electric motor 10 based on main actual axis phase signal $\theta$d(Main) to a state where motor drive control part 32 controls electric motor 10 based on auxiliary actual axis phase signal θd(Sub); and immediately after a predetermined time period elapses, restart the abnormality determination.

FIGS. 12 and 13 are flow charts showing the abnormality determination control for motor rotational position sensors PS1, PS2 according to the present embodiment.

As shown in FIG. 12, in the present embodiment, at Steps S301-S303, control device 11 performs operations similar to Steps S101-S103 in the flow chart of the first embodiment. Subsequently, at Step S304, control device 11 determines whether or not a main sensor diagnosis flag "Fm", which is set at Step S314 described below, or an auxiliary sensor diagnosis flag "Fs", which is set at Step S317 described below, is set. In case of NO at Step S304 (neither is set), control device 11 proceeds to Step S305.

At Step S305, control device 11 determines whether or not the absolute value of the difference between main actual axis phase signal θd(Main) and auxiliary actual axis phase signal θd(Sub) calculated by actual axis phase comparison part 53 is greater than predetermined value θz. In case of NO at Step S305, control device 11 determines that both of motor rotational position sensors PS1, PS2 are normal, and clears motor rotational position sensor abnormality counter Cs (Step S321), and thereafter terminates the present program.

On the other hand, in case of YES at Step S305, control device 11 increments the motor rotational position sensor abnormality counter Cs (Step S306), and thereafter determines whether or not motor rotational position sensor abnormality counter Cs is greater than predetermined value Cx (Step S307). In case of NO at Step S307, control device 11 terminates the present program, without confirmation of the abnormality.

On the other hand, in case of YES at Step S307, control device 11 confirms that at least one of motor rotational position sensors PS1, PS2 becomes abnormal, and thereafter performs Step S308 and the following operations for confirming which one of motor rotational position sensors PS1, PS2 is abnormal.

That is implemented by calculating the main phase difference Δθ(Main) (Step S308), and thereafter determining whether or not motor rotational speed ωr estimated from steering speed signal ωs is greater than predetermined value ωx (Step S309).

In case of NO at Step S309, since it is difficult to determine which one of motor rotational position sensors PS1, PS2 is failed, control device 11 causes failsafe processing part 34 to shut off the steering assist control system (Step S319), and further outputs a warning to a driver, namely, warns the driver by turning on the warning light on the instrument panel of the vehicle (Step S320), and thereafter terminates the present program.

On the other hand, in case of YES at Step S309, control device 11 determines whether or not main phase difference Δθ(Main) is greater than predetermined value Δθx (Step S310).

In case of YES at Step S310, control device 11 determines that main motor rotational position sensor PS1 becomes failed, and shifts the actual axis phase signal from main actual axis phase signal θd(Main) to auxiliary actual axis phase signal θd(Sub) for the motor drive control (Step S311), and clears a stabilization timer counter "Tset" (Step S312), and sets auxiliary sensor diagnosis flag Fs (Step S313), and resets main sensor diagnosis flag Fm (Step S314), and outputs a warning to a driver (Step S315), and terminates the present program.

On the other hand, in case of NO at Step S310, control device 11 determines that auxiliary motor rotational position sensor PS2 becomes failed, and resets auxiliary sensor diagnosis flag Fs (Step S316), and sets main sensor diagnosis flag Fm (Step S317), and outputs a warning to a driver (Step S318), and terminates the present program.

In case of YES at Step S304, namely, when at least one of main and auxiliary motor rotational position sensors PS1, PS2 becomes abnormal, and main sensor diagnosis flag Fm or auxiliary sensor diagnosis flag Fs is set, control device 11 proceeds to Step S322 shown in FIG. 13.

At Step S322, control device 11 determines whether or not auxiliary sensor diagnosis flag Fs is set. In case of YES at Step S322, control device 11 determines whether or not stabilization timer counter Tset is greater than a predetermined value Tx (Step S323). In case of NO at Step S323, control device 11 increments the stabilization timer counter Tset (Step S328), and thereafter terminates the present program.

On the other hand, in case of YES at Step S323, namely, when it is determined that the predetermined time period has elapsed after the motor rotational position sensor employed for motor drive control is shifted from main motor rotational position sensor PS1 to auxiliary motor rotational position sensor PS2, control device 11 calculates auxiliary phase difference Δθ(Sub) (Step S324), and further determines whether or not motor rotational speed ωr is greater than predetermined value ωx (Step S325). In case of NO at Step S325, control device 11 terminates the present program without diagnosis, for prevention of incorrect diagnosis. On the other hand, in case of YES at Step S325, control device 11 determines that the diagnosis is to be continued, and proceeds to Step S326.

At Step S326, control device 11 determines whether or not auxiliary phase difference Δθ(Sub) calculated at Step S324 is greater than predetermined value Δθx. In case of NO at Step S326, control device 11 determines that no abnormality occurs in auxiliary motor rotational position sensor PS2, and terminates the present program.

On the other hand, in case of YES at Step S326, control device 11 determines that both of main and auxiliary motor rotational position sensors PS1, PS2 become abnormal, and causes failsafe processing part 34 to shut off the steering assist control system based on electric motor 10 (Step S327), and thereafter terminates the present program.

In case of NO at Step S322, control device 11 calculates main phase difference Δθ(Main) (Step S329), and thereafter determines whether or not motor rotational speed ωr is greater than predetermined value ωx (Step S330). In case of NO at Step S330, control device 11 terminates the present program without diagnosis, for prevention of incorrect diagnosis. On the other hand, in case of YES at Step S330, control device 11 determines that the diagnosis is to be continued, and proceeds to Step S331.

At Step S331, control device 11 determines whether or not main phase difference Δθ(Main) calculated at Step S329 is greater than predetermined value Δθx. In case of NO at Step S331, control device 11 determines that no abnormality occurs in main motor rotational position sensor PS1, and terminates the present program.

On the other hand, in case of YES at Step S331, control device 11 determines that both of main and auxiliary motor rotational position sensors P51, PS2 become abnormal, and causes failsafe processing part 34 to shut off the steering assist control system based on electric motor 10 (Step S332), and thereafter terminates the present program.

Also in the present embodiment configured as described above, it is possible to determine precisely by sensor abnormality determination part 49 whether or not each motor rotational position sensor PS1, PS2 is abnormal.

In the present embodiment, the feature that sensor abnormality determination part 49 determines abnormality of each motor rotational position sensor P51, PS2 depending on a result of comparison between main and auxiliary actual axis phase signals θd(Main), θd(Sub) outputted by main and auxiliary motor rotational position sensors PS1, PS2, serves to enhance the precision of abnormality determination.

In particular, the feature that it determines that main motor rotational position sensor PS1 is abnormal, when actual axis phase signal θd(Main) outputted by main motor rotational position sensor PS1 is significantly apart from both of actual axis phase signal θd(Sub) outputted by auxiliary motor rotational position sensor PS2 and control phase signal θdc, serves to enhance the precision of abnormality determination for main motor rotational position sensor PS1.

In the present embodiment, the feature that sensor abnormality determination part 49 is configured to be prevented from determining abnormality of auxiliary motor rotational position sensor PS2 immediately after the motor rotational position sensor employed for drive control of electric motor 10 is shifted from main motor rotational position sensor PS1 to auxiliary motor rotational position sensor PS2, serves to suppress determination based on auxiliary actual axis phase signal θd(Sub) before auxiliary motor rotational position sensor PS2 is completely started up, and thereby further suppress incorrect determination.

The present invention is not limited to the configurations of the embodiments described above. Specific configuration of the present invention may be modified in accordance with device specifications without going out of the substance of the present invention.

The power steering devices and the power steering device control devices according to the embodiments described above can be implemented by the following modes, for example.

According to one mode, a power steering device control device for a power steering device, the power steering device including: a steering mechanism configured to transmit rotation of a steering wheel to a steered wheel; an electric motor configured to apply a steering assist force to the steering mechanism; a transmission mechanism disposed between the steering mechanism and the electric motor, and configured to transmit a torque of the electric motor to the steering mechanism; and a first motor rotational position sensor configured to sense as an actual axis phase a rotational position of a rotor of the electric motor; the power steering device control device includes: an actual axis phase signal receiving part configured to receive input of a signal of first actual axis phase outputted from the first motor rotational position sensor; a motor current signal receiving part configured to receive input of a signal of value of electric current flowing through the electric motor; a control phase estimation part configured to estimate as a control phase a phase of an induced voltage occurring in the electric motor, based on the signal of value of electric current; and a sensor abnormality determination part configured to determine whether or not the first motor rotational position sensor is abnormal, based on a difference between the first actual axis phase and the control phase.

According to a preferable mode, the power steering device control device is configured such that: the power steering device further includes a second motor rotational position sensor configured to sense as an actual axis phase the rotational position of the rotor of the electric motor; the power steering device control device further includes a motor drive control part configured to control driving of the electric motor, based on the signal of first actual axis phase; and the motor drive control part is configured to control driving of the electric motor, based on an output signal of the second motor rotational position sensor as a signal of second actual axis phase, in response to a determination that the first motor rotational position sensor is abnormal.

According to another preferable mode, the power steering device control device according to one of the modes described above further includes an actual axis phase comparison part configured to compare the signal of first actual axis phase with the signal of second actual axis phase, wherein the sensor abnormality determination part is configured to determine whether or not the first motor rotational position sensor is abnormal, based on the difference between the first actual axis phase and the control phase, and a result of the comparison by the actual axis phase comparison part.

According to another preferable mode, the power steering device control device according to one of the modes described above is configured such that the sensor abnormality determination part is configured to determine that the first motor rotational position sensor is abnormal, in response to a condition that a difference between the signal of first actual axis phase and the signal of second actual axis phase is greater than a predetermined value, and the difference between the first actual axis phase and the control phase is greater than a predetermined value.

According to another preferable mode, the power steering device control device according to one of the modes described above is configured such that the sensor abnormality determination part is configured to determine whether or not the second motor rotational position sensor is abnormal, based on a difference between the second actual axis phase and the control phase, when the motor drive control part is controlling driving of the electric motor based on the signal of second actual axis phase.

According to another preferable mode, the power steering device control device according to one of the modes described above is configured such that the sensor abnormality determination part is configured to start to determine whether or not the second motor rotational position sensor is abnormal, in response to a lapse of a predetermined time period after the motor drive control part shifts from the drive control based on the signal of first actual axis phase to the drive control based on the signal of second actual axis phase.

According to another preferable mode, the power steering device control device according to one of the modes described above is configured such that the sensor abnormality determination part is configured to determine whether or not the second motor rotational position sensor is abnormal, based on a difference between the second actual axis phase and the control phase, when the motor drive control part is controlling driving of the electric motor based on the signal of second actual axis phase.

According to another preferable mode, the power steering device control device according to one of the modes described above is configured such that the motor drive control part is configured to control driving of the electric motor such that output of the electric motor decreases, after shifting from the drive control based on the signal of first actual axis phase to the drive control based on the signal of second actual axis phase.

According to another preferable mode, the power steering device control device according to one of the modes described above is configured such that the motor drive control part is configured to control driving of the electric motor such that output of the electric motor decreases gradually, after shifting from the drive control based on the signal of first actual axis phase to the drive control based on the signal of second actual axis phase.

According to another preferable mode, the power steering device control device according to one of the modes described above is configured such that the sensor abnormality determination part is configured to determine whether or not the first motor rotational position sensor is abnormal, based on comparison between the difference between the first actual axis phase and the control phase and a difference between the second actual axis phase and the control phase.

According to another preferable mode, the power steering device control device according to one of the modes described above is configured such that the sensor abnormality determination part is configured to stop determining whether or not the first motor rotational position sensor is abnormal, in response to a condition that rotational speed of the electric motor is less than or equal to a predetermined value.

According to another preferable mode, the power steering device control device according to one of the modes described above is configured such that the rotational speed of the electric motor is configured to be estimated based on a signal other than the signal outputted from the first motor rotational position sensor.

According to another preferable mode, the power steering device control device according to one of the modes described above further includes a steering angle signal receiving part configured to receive input of a signal of rotational angle of the steering wheel as steering angle, wherein the rotational speed of the electric motor is configured to be estimated based on the signal of steering angle.

According to another preferable mode, the power steering device control device according to one of the modes described above further includes: a torsion bar provided in the steering mechanism; and a steering angle sensor disposed closer to the steering wheel than the torsion bar, and configured to sense the steering angle; wherein the rotational speed of the electric motor is configured to be estimated depending on a quantity of torsion of the torsion bar.

According to another preferable mode, the power steering device control device according to one of the modes described above is configured such that the sensor abnormality determination part is configured to: calculate the difference between the first actual axis phase and the control phase, based on a voltage (Vdc) in a d-axis, a voltage (Vqc) in a q-axis, a sensed electric current (Idc) in the d-axis, a sensed electric current (Iqc) in the q-axis, and a rotational speed (ω1) of the control phase, wherein the d-axis is a pole-to-pole direction of the rotor of the electric motor, and wherein the q-axis is perpendicular to the d-axis; and determine whether or not the first motor rotational position sensor is abnormal, based on a result of the calculation of the difference.

According to another preferable mode, the power steering device control device according to one of the modes described above is configured such that the sensor abnormality determination part is configured to calculate the difference between the first actual axis phase and the control phase, further depending on a resistance (r) of winding of the electric motor and an inductance (Lq) of the electric motor.

According to another preferable mode, the power steering device control device according to one of the modes described above is configured such that the sensor abnormality determination part is configured to calculate the difference between the first actual axis phase and the control phase by using the following equation:

$$\Delta\theta = \tan^{-1}\left[\frac{Vdc - r \cdot Idc + \omega 1 Lq \cdot Iqc}{Vqc - r \cdot Iqc - \omega 1 Lq \cdot Idc}\right].$$

According to another preferable mode, the power steering device control device according to one of the modes described above is configured such that the sensor abnormality determination part is configured to calculate the difference between the first actual axis phase and the control phase by using the following equation:

$$\Delta\theta = \tan^{-1}\left[\frac{Idc - r \cdot Vdc + \omega 1 Lq \cdot Vqc}{Iqc - r \cdot Vqc - \omega 1 Lq \cdot Vdc}\right].$$

According to one mode, a power steering device includes: a steering mechanism configured to transmit rotation of a steering wheel to a steered wheel; an electric motor configured to apply a steering assist force to the steering mechanism; a transmission mechanism disposed between the steering mechanism and the electric motor, and configured to transmit a torque of the electric motor to the steering mechanism; a first motor rotational position sensor configured to sense as an actual axis phase a rotational position of a rotor of the electric motor; and a control device configured to control driving of the electric motor; the control device including: an actual axis phase signal receiving part configured to receive input of a signal of first actual axis phase outputted from the first motor rotational position sensor; a motor current signal receiving part configured to receive input of a signal of value of electric current flowing through the electric motor; a control phase estimation part configured to estimate as a control phase a phase of an induced voltage occurring in the electric motor, based on the signal of value of electric current; and a sensor abnormality determination part configured to determine whether or not the first motor rotational position sensor is abnormal, based on a difference between the first actual axis phase and the control phase.

According to a preferable mode, the power steering device is configured such that: the power steering device further includes a second motor rotational position sensor configured to sense as an actual axis phase the rotational position of the rotor of the electric motor; the control device further includes a motor drive control part configured to control driving of the electric motor, based on the signal of first actual axis phase; and the motor drive control part is configured to control driving of the electric motor, based on an output signal of the second motor rotational position sensor as a signal of second actual axis phase, in response to a determination that the first motor rotational position sensor is abnormal.

The invention claimed is:

1. A power steering device control device for a power steering device, the power steering device including:
a steering mechanism configured to transmit rotation of a steering wheel to a steered wheel;
an electric motor configured to apply a steering assist force to the steering mechanism;
a transmission mechanism disposed between the steering mechanism and the electric motor, and configured to transmit a torque of the electric motor to the steering mechanism; and a first motor rotational position sensor configured to sense as an actual axis phase a rotational position of a rotor of the electric motor;

the power steering device control device comprising:

an actual axis phase signal receiving part configured to receive an input of a signal of a first actual axis phase outputted from the first motor rotational position sensor;

a motor current signal receiving part configured to receive an input of a signal of a value of electric current flowing through the electric motor;

a control phase estimation part configured to estimate as a control phase a phase of an induced voltage occurring in the electric motor, based on the signal of the value of electric current; and a sensor abnormality determination part configured to determine whether or not the first motor rotational position sensor is abnormal, based on a difference between the first actual axis phase and the control phase, wherein:

the power steering device further includes a second motor rotational position sensor configured to sense as an actual axis phase the rotational position of the rotor of the electric motor;

the power steering device control device further comprises a motor drive control part configured to control driving of the electric motor, based on the signal of the first actual axis phase;

the motor drive control part is configured to control driving of the electric motor, based on an output signal of the second motor rotational position sensor as a signal of a second actual axis phase, in response to a determination that the first motor rotational position sensor is abnormal; and the power steering device control device further comprises an actual axis phase comparison part configured to compare the signal of the first actual axis phase with the signal of the second actual axis phase, wherein the sensor abnormality determination part is configured to determine whether or not the first motor rotational position sensor is abnormal, based on the difference between the first actual axis phase and the control phase, and a result of the comparison by the actual axis phase comparison part.

2. The power steering device control device as claimed in claim 1, wherein the sensor abnormality determination part is configured to determine that the first motor rotational position sensor is abnormal, in response to a condition that a difference between the signal of the first actual axis phase and the signal of the second actual axis phase is greater than a predetermined value, and the difference between the first actual axis phase and the control phase is greater than a predetermined value.

3. The power steering device control device as claimed in claim 2, wherein the sensor abnormality determination part is configured to determine whether or not the second motor rotational position sensor is abnormal, based on a difference between the second actual axis phase and the control phase, when the motor drive control part is controlling driving of the electric motor based on the signal of the second actual axis phase.

4. The power steering device control device as claimed in claim 3, wherein the sensor abnormality determination part is configured to start to determine whether or not the second motor rotational position sensor is abnormal, in response to a lapse of a predetermined time period after the motor drive control part shifts from the drive control based on the signal of the first actual axis phase to the drive control based on the signal of the second actual axis phase.

5. The power steering device control device as claimed in claim [[2]]1, wherein the sensor abnormality determination part is configured to determine whether or not the second motor rotational position sensor is abnormal, based on a difference between the second actual axis phase and the control phase, when the motor drive control part is controlling driving of the electric motor based on the signal of the second actual axis phase.

6. The power steering device control device as claimed in claim 1, wherein the motor drive control part is configured to control driving of the electric motor such that an output of the electric motor decreases, after shifting from the drive control based on the signal of the first actual axis phase to the drive control based on the signal of the second actual axis phase.

7. The power steering device control device as claimed in claim 1, wherein the motor drive control part is configured to control driving of the electric motor such that an output of the electric motor decreases gradually, after shifting from the drive control based on the signal of the first actual axis phase to the drive control based on the signal of the second actual axis phase.

8. The power steering device control device as claimed in claim 1, wherein the sensor abnormality determination part is configured to determine whether or not the first motor rotational position sensor is abnormal, based on comparison between the difference between the first actual axis phase and the control phase and a difference between the second actual axis phase and the control phase.

9. The power steering device control device as claimed in claim 1, wherein the sensor abnormality determination part is configured to stop determining whether or not the first motor rotational position sensor is abnormal, in response to a condition that rotational speed of the electric motor is less than or equal to a predetermined value.

10. The power steering device control device as claimed in claim 9, wherein the power steering control device is configured to cause the rotational speed of the electric motor is configured to be estimated based on a signal other than the signal outputted from the first motor rotational position sensor.

11. The power steering device control device as claimed in claim 10, further comprising a steering angle signal receiving part configured to receive an input of a signal of a rotational angle of the steering wheel as a steering angle, wherein the power steering control device is configured to cause the rotational speed of the electric motor configured to be estimated based on the signal of the steering angle.

12. The power steering device control device as claimed in claim 11, further comprising:

a torsion bar provided in the steering mechanism; and a steering angle sensor disposed closer to the steering wheel than the torsion bar, and configured to sense the steering angle, wherein the power steering control device is configured to cause the rotational speed of the electric motor is to be estimated depending on a quantity of torsion of the torsion bar.

13. The power steering device control device as claimed in claim 1, wherein the sensor abnormality determination part is configured to:

calculate the difference between the first actual axis phase and the control phase, based on a voltage in a d-axis, a voltage in a q-axis, a sensed electric current in the d-axis, a sensed electric current in the q-axis, and a rotational speed of the control phase, wherein the d-axis is a pole-to-pole direction of the rotor of the electric motor, and wherein the q-axis is perpendicular to the d-axis; and determine whether or not the first motor rotational position sensor is abnormal, based on a result of the calculation of the difference.

14. The power steering device control device as claimed in claim 13, wherein the sensor abnormality determination part is configured to calculate the difference between the first actual axis phase and the control phase, further depending on a resistance of winding of the electric motor and an inductance of the electric motor.

15. The power steering device control device as claimed in claim 14, wherein the sensor abnormality determination part is configured to calculate the difference between the first actual axis phase and the control phase by using the following equation:

$$\Delta\theta = \tan^{-1}\left[\frac{Vdc - r \cdot Idc + \omega 1Lq \cdot Iqc}{Vqc - r \cdot Iqc - \omega 1Lq \cdot Idc}\right].$$

16. The power steering device control device as claimed in claim 15, wherein the sensor abnormality determination part is configured to calculate the difference between the first actual axis phase and the control phase by using the following equation:

$$\Delta\theta = \tan^{-1}\left[\frac{Idc - r \cdot Vdc + \omega 1Lq \cdot Vqc}{Iqc - r \cdot Vqc - \omega 1Lq \cdot Vdc}\right].$$

17. A power steering device comprising:
a steering mechanism configured to transmit rotation of a steering wheel to a steered wheel;
an electric motor configured to apply a steering assist force to the steering mechanism;
a transmission mechanism disposed between the steering mechanism and the electric motor, and configured to transmit a torque of the electric motor to the steering mechanism;
a first motor rotational position sensor configured to sense as an actual axis phase a rotational position of a rotor of the electric motor; and
a control device configured to control driving of the electric motor;
the control device including:
an actual axis phase signal receiving part configured to receive an input of a signal of a first actual axis phase outputted from the first motor rotational position sensor;
a motor current signal receiving part configured to receive an input of a signal of a value of electric current flowing through the electric motor;
a control phase estimation part configured to estimate as a control phase a phase of an induced voltage occurring in the electric motor, based on the signal of the value of electric current; and
a sensor abnormality determination part configured to determine whether or not the first motor rotational position sensor is abnormal, based on a difference between the first actual axis phase and the control phase;
wherein:
the power steering device further comprises a second motor rotational position sensor configured to sense as an actual axis phase the rotational position of the rotor of the electric motor;
the control device further comprises a motor drive control part configured to control driving of the electric motor based on the signal of the first actual axis phase;
the motor drive control part is configured to control driving of the electric motor, based on an output signal of the second motor rotational position sensor as a signal of the second actual axis phase, in response to a determination that the first motor rotational position sensor is abnormal; and
the control device further comprises an actual axis phase comparison part configured to compare the signal of the first actual axis phase with the signal of the second actual axis phase, wherein the sensor abnormality determination part is configured to determine whether or not the first motor rotational position sensor is abnormal, based on the difference between the first actual axis phase and the control phase, and a result of the comparison by the actual axis phase comparison part.

\* \* \* \* \*